Oct. 5, 1943.  G. W. DAUGHERTY  2,331,107
SPRAYING MACHINE
Filed Aug. 26, 1939    5 Sheets-Sheet 5
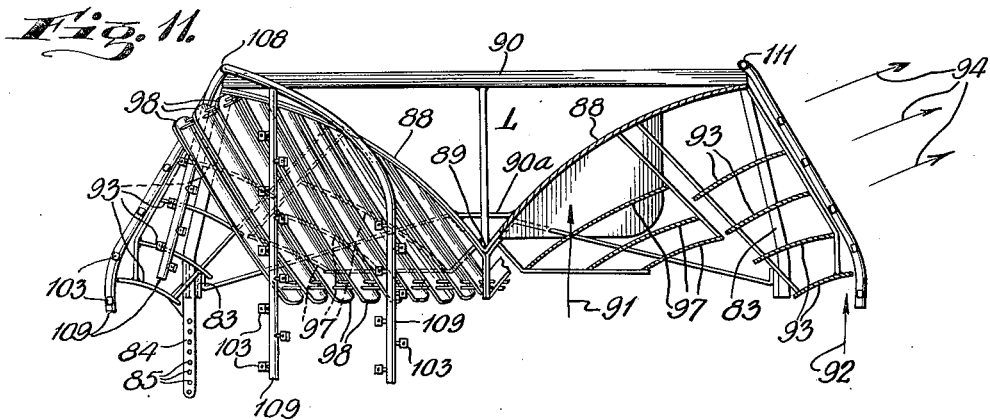
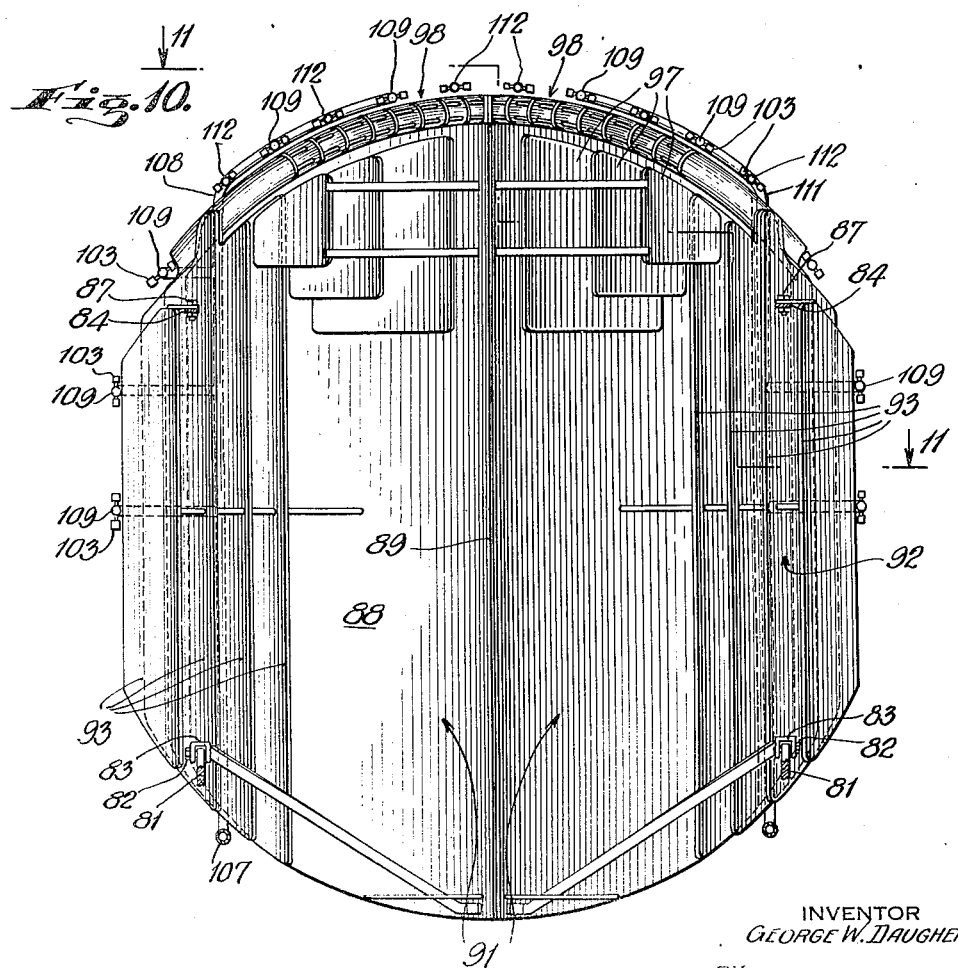
INVENTOR
GEORGE W. DAUGHERTY
BY
A. H. Golden
ATTORNEY Patented Oct. 5, 1943

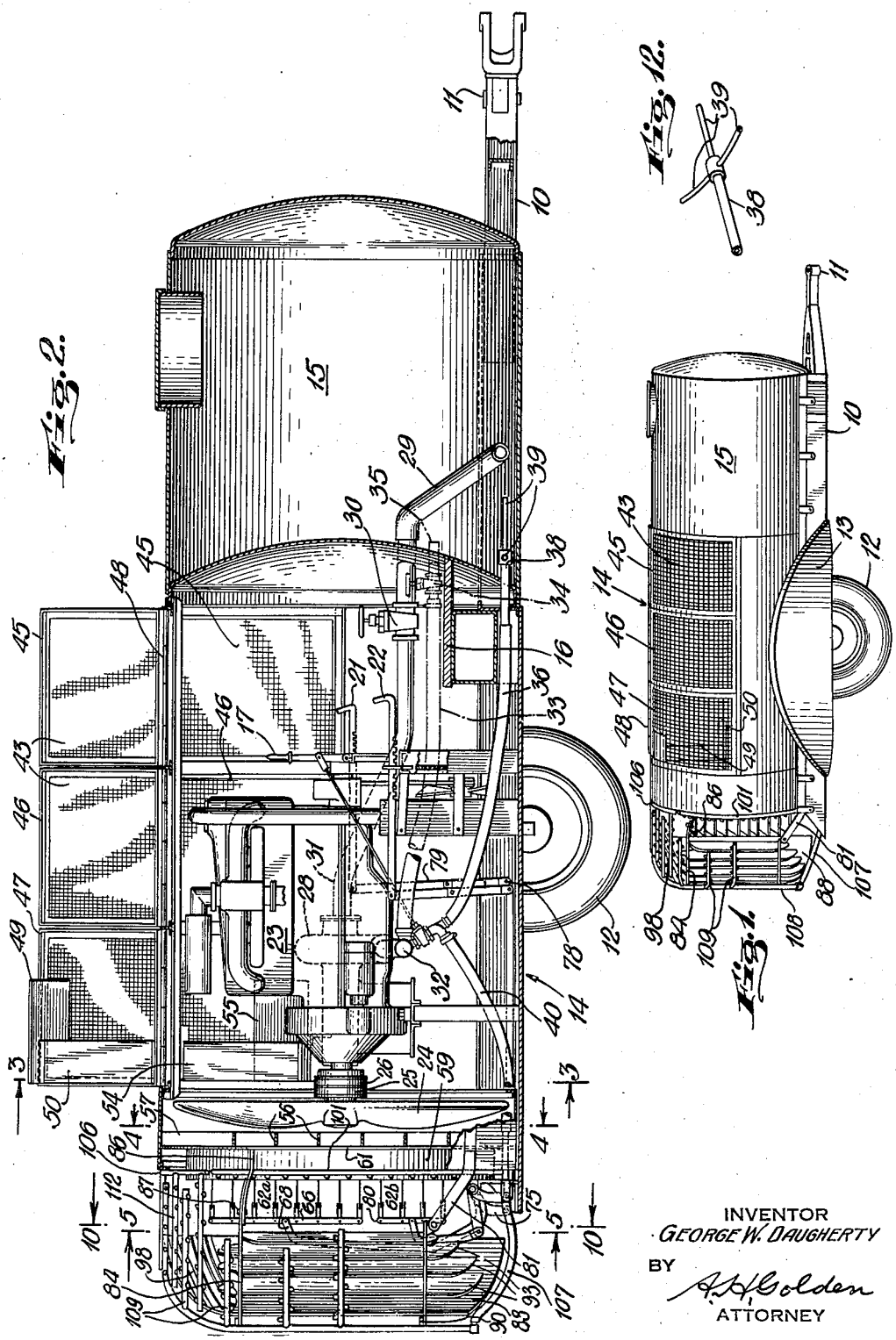

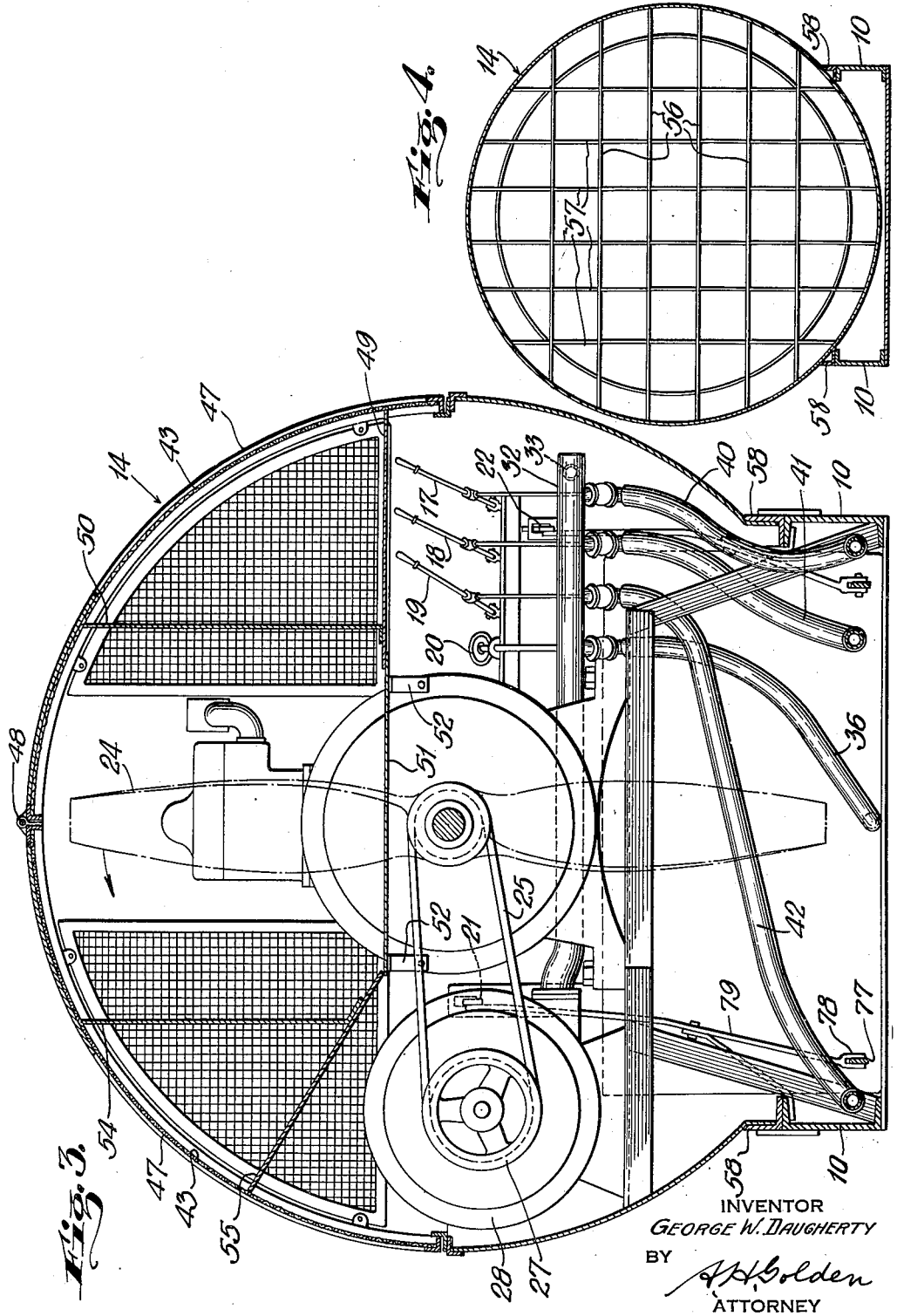

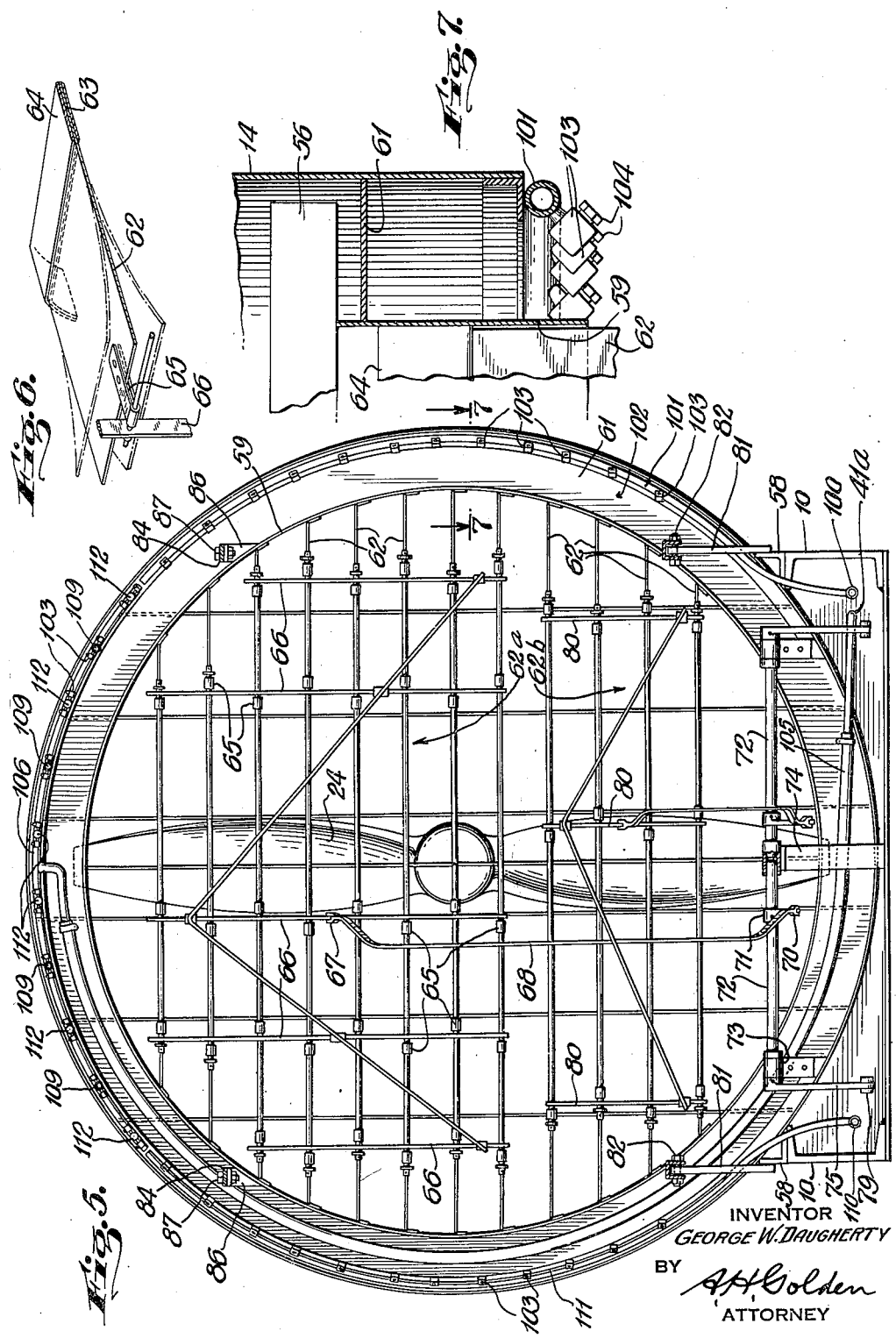

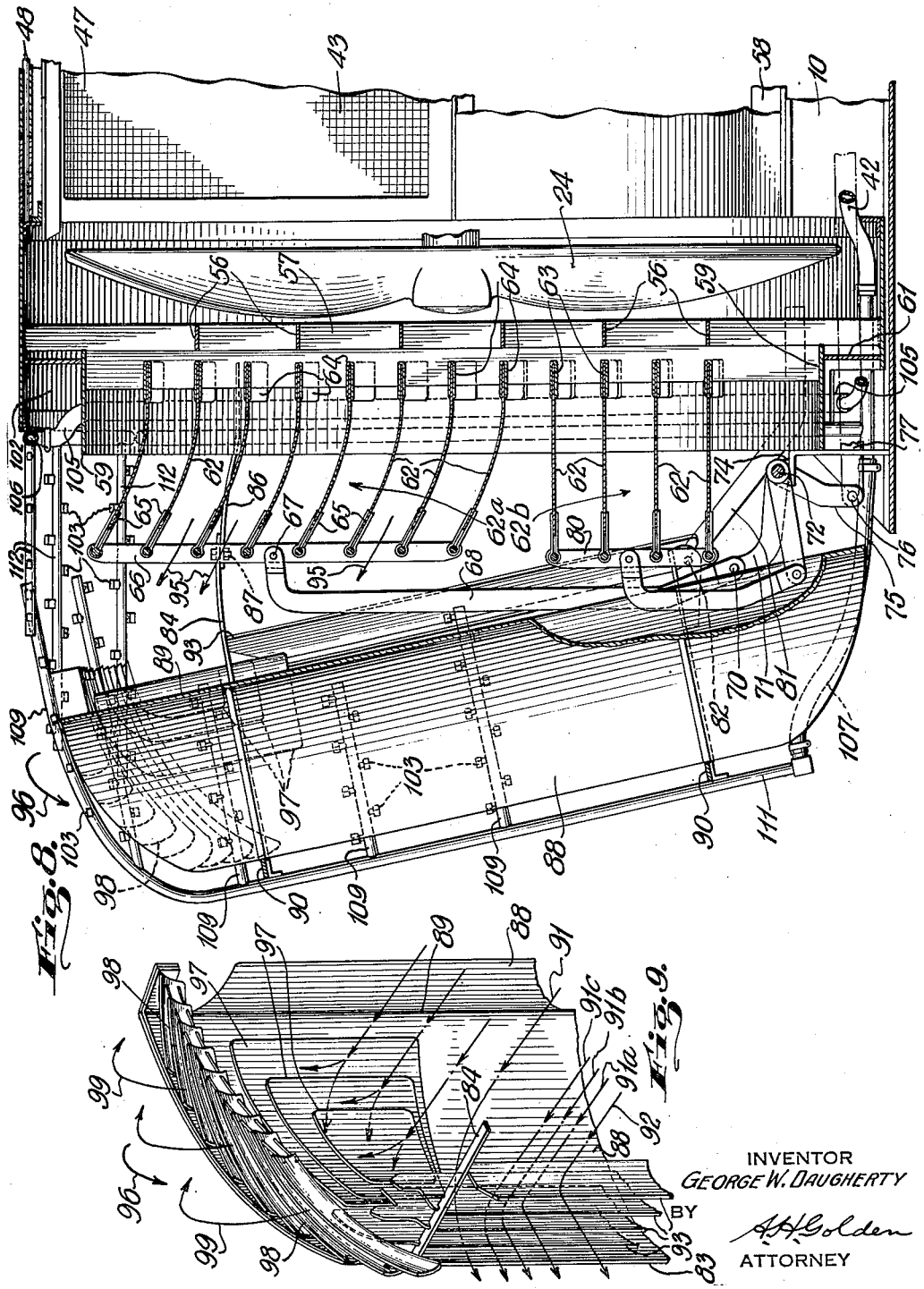

2,331,107

UNITED STATES PATENT OFFICE 2,331,107

SPRAYING MACHINE

George W. Daugherty, Orlando, Fla.

Application August 26, 1939, Serial No. 292,055

22 Claims. (Cl. 261—30)

This invention relates to a spraying machine of the type disclosed in my application for patent Serial No. 104,573, filed October 8, 1936, and renewed on July 12, 1939, now U. S. Patent 2,220,082, dated November 5, 1940. The machine disclosed in this application embodies the general principles set forth in my first application, but includes a great many structures based on novel conceptions, whereby I achieve unusual and unexpected results.

In general, it is the object of my invention to contribute to this art certain results which have been sought for over a period of many years. Those familiar with the art will appreciate that dusting machines and spraying machines are not broadly new, and that for many years men have sought to obtain complete and wide coverage of large acreage during short periods of time. As a matter of fact, this desire to obtain complete coverage of large acreage during a short period of time has led to spraying and dusting by airplane. Airplane dusting and spraying is extremely dangerous, however, is wasteful of material, and uniform coverage is almost impossible to obtain. In addition, dusting and spraying by airplane is clearly dependent upon the absence of wind for its effectiveness, as will be appreciated. In general, it may be stated that heretofore, fast spraying has always been accompanied by poor coverage and extreme waste of material.

My invention contributes to the art a machine whereby complete coverage is obtained over a large area, and during a short interval of time, while at the same time, great economy of material is effected. In the main, it is my extremely accurate control of the spraying material and the air blast in which it is carried, while obtaining fast coverage, which is the most desirable feature of my machine.

A further feature of my invention which is also of extreme importance, is the feature of the complete dispersion of the spraying material whereby a uniform coating is applied to the plants to be sprayed, thus leading to further economy of spraying material.

Having now indicated generally the objects of my invention, and the results obtained with my machine, I should like to describe somewhat more in detail the arrangement of the mechanism whereby I achieve the particular results. Later in this specification, I shall describe in detail the specific construction of a preferred form of machine embodying my contribution to this art.

In carrying out my invention, I utilize an air tunnel somewhat similar to that described in my earlier application. As an extension of this air tunnel, I form a tank which carries my spraying material, so that I am able to obtain a rather stream-lined effect and a comparatively compact machine. In this application I shall describe my invention as using liquid spray material, it being understood that many features of the invention may be used with dusting material. The term spray material is therefore used hereinafter to denote material to be picked up and deposited by the air streams developed in my air tunnel. Within the tunnel, I mount an internal combustion engine which I use preferably as a source of power, and for generating an air blast through the air tunnel I prefer to mount on the main shaft of this engine a propeller of the airplane type. I have found that a blade about sixty inches in length and capable of generating one hundred eighty-two thousand cubic feet of air per minute is quite effective for the spraying of orange trees. Naturally, changes in the size of the propeller and air tunnel may be made to suit various conditions and crops.

In order to spray economically such crops as oranges growing on orange trees of varying sizes, I arrange to divide my air blast issuing from the tunnel into two air streams, so that as my machine is drawn through an orange grove, it will spray the trees on each side thereof. It was only after much study on my part that I finally conceived the solution of the problem presented in the provision of means for suitably dividing the tunnel air blast into two air streams.

I finally devised a pair of diverging or oppositely curved deflectors. These deflectors meet naturally along the vertical middle of the air tunnel, and curve so as to deflect the air into two air streams. The curvature which I shall show in my application is that best suited for the particular spraying problem for which my machine is developed, namely, orange groves. The curvature is so arranged that the air streams will diverge outwardly at each side of the machine, the low pressure area between the outer surfaces of the deflectors serving to control the distance through which the air streams will move the spraying material. I have found that the relatively low pressure area between the outer surfaces of the deflectors will act to limit, or pull in, the air stream so as to give a sharp cut-off effect to the movement of the spray, all as will be further emphasized later in this specification.

I have found further that if the air blast from the tunnel is impressed against the curved deflectors, it will more or less choke itself, since the air blast issuing from near the surface wall of the tunnel will strike the deflecting surface in such relation to the air stream formed by the air issuing from near the central portion of the tunnel, as to cause a conflict between the two air streams, all as will be fully appreciated. In order to obviate this conflict, I utilize a series of auxiliary deflectors having substantially the same radius of curvature as the main pair of deflectors, and spaced relatively to one another and to the main pair of deflectors.

In order to control the movement of the air streams upwardly as well as outwardly, a form of control necessary for the spraying of trees, I utilize a series of vanes, preferably horizontally mounted, which are of such form and so mounted as to be readily flexed to form curved air guiding surfaces. These vanes, which I call horizontal vanes as distinguished from the deflectors, are actually elevators intended to elevate the air streams generated by the propeller. I have found, however, that the air streams thus directed upwardly by the horizontal vanes are inclined to pull in, or drop down into the low pressure area between the pair of air deflectors, presenting a very difficult problem. I solve this problem and eliminate the effects of this pull or drop of the upwardly directed air stream, by first arranging to move the pair of main deflectors away from the horizontal vanes and outwardly relatively to the tunnel and the horizontal vanes whenever I wish to spray trees of more than moderate height. Secondly, I conceived means which I employ between the horizontal vanes and the pair of main deflectors for further imparting direction to the air streams so that they tend to move upwardly and outwardly, thus adding to the directioning contributed to the air streams by the horizontal vanes themselves. Such means as I utilize, I shall term hereinafter auxiliary vanes, these vanes being mounted in the upper sector of the circle defined by the tunnel, and cooperating with the main horizontal vanes in a manner to be set forth presently.

The horizontal vanes of my invention are flexed, as previously indicated generally by me, and are arranged for operation in two series by means controlled from an operator's platform mounted within the tunnel. Similarly, I arrange for the control of the spraying material from a point accessible to an operator sitting on the said operator's platform. This control of the spraying by an operator within the tunnel is novel in this art, as will be appreciated.

The spraying material is fed from the usual tank, and under the control of the operator, into a series of nozzles spaced circumferentially and otherwise about and relatively to the tunnel, and preferably somewhat outside the mouth of the tunnel at the exhaust end thereof. As a matter of fact, the spray nozzles are preferably so formed that the spraying material will issue therefrom in a direction somewhat away from the movement of the air streams, so that the air streams will actually have to pull the spray therein and then transform it into a fine fog of material.

For high spraying under the control of the horizontal vanes and the auxiliary vanes previously described, I use several series of spray nozzles extending above the horizontal vanes and the various auxiliary vanes and deflectors.

As a further feature of my invention, I arrange for a series of air straightening baffles, or guides, which are mounted on the intake side of the propeller. It was only after considerable difficulty that I conceived the use of these baffles for preventing the banking of the air by the propeller at one side or the other of the tunnel. Through the use of my air baffles, I am able to obtain rather equal distribution of air into the propeller, and therefore, outwardly of the tunnel.

In order that this distribution of air shall be direct and parallel to the tunnel axis, so that the horizontal vanes and deflectors already described may be more effective, I provide a series of horizontal and vertical guide plates mounted at the open end of the tunnel for straightening any portion of the air blast which is not directed outwardly of the tunnel as desired.

As a further feature of my invention, I have a novel means for agitating the spraying fluid within the tank, utilizing the spraying material itself for agitating the spraying material within the tank.

It may be well at this time to point out that I have actually built and used a machine such as shown by me in this application, and that this machine has given me results which are exceedingly outstanding and are not at all comparable with any results previously obtained in spraying. My machine has more particularly been found extremely effective for the spraying of orange trees because it will spray not only low trees, or "bud" trees, but will spray also the "seedlings" which are high trees. Naturally, my machine is usable for spraying almost any type of tree or crop. My machine has been found by actual test to give complete coverage and almost perfect diffusion of spraying material, while spraying at an unprecedented speed.

Having now described generally my contribution to the art, I shall refer to the drawings for a detailed description of a preferred form of machine embodying my invention. In the drawings, Fig. 1 is a perspective view of my machine showing its general outline and the means whereby it is supported for transportation. Fig. 2 is an enlarged view similar to Fig. 1, but with parts broken away showing the interior mechanism. Fig. 3 is a section along lines 3—3 of Fig. 2, while Fig. 4 is a section along lines 4—4 of Fig. 2. Fig. 5 is a section along lines 5—5 of Fig. 2. Fig. 6 is a detailed view showing the mounting and flexing of one of my horizontal vanes. Fig. 7 is a section along lines 7—7 of Fig. 5. Fig. 8 is a view similar to Fig. 2 of certain parts, but showing the parts enlarged and with the pair of vertical deflectors moved into a position allowing for high spraying. Fig. 9 is a view of certain of the parts of Fig. 8, shown in perspective, illustrating the movement of one of the air streams. Fig. 10 is a view along lines 10—10 of Fig. 2, while Fig. 11 is a view taken along lines 11—11 of Fig. 10. Fig. 12 is a perspective view of the agitator.

Referring now more particularly to the drawings and more especially to Figs. 1 and 2, reference numeral 10 indicates a chassis frame having a hitch 11 whereby it may be hooked to a tractor or other pulling device, the chassis being supported by a pair of usual wheels 12 protected by fenders 13. My machine may be mounted on a truck, if desired, and will operate just as it does when in its form of Fig. 1. Mounted on the chassis 10 is an air tunnel, designated generally by reference numeral 14, and a fluid tank 15 containing spraying material. The tank 15 forms a streamlined continuation of the air tunnel 14, as is readily seen.

Within the air tunnel itself, there is a seat 16 on which is adapted to sit an operator in position to control a series of control levers 17, 18 and 19, shown best in Fig. 3, and a valve 20, also shown in Fig. 3. The operator has also available for control a pair of ratcheted control rods 21 and 22 which function in a manner to be described later.

An internal combustion engine 23 is adapted to rotate the propeller 24, as is best seen in Figs. 2 and 3. Formed on the shaft carrying the propeller 24 are a pair of pulleys on which belts 25 and 26 are mounted for cooperation with pulleys 27 for driving a pump 28. The pump has an intake pipe 29, best seen in Fig. 2, whereby spraying material is carried through the valve 30 and pipe 31 into the pump, and from the pump forced into what I prefer to call a manifold 32, best illustrated in Fig. 3. Running from this manifold is a pipe 33 terminating in a pressure relief valve 34 which leads at 35 back to the tank 15. In this way, the pressure within the manifold is readily controlled to a degree determined by the setting of the relief valve, all of which will be readily appreciated.

Running from the manifold, there is a further pipe 36 which extends into an agitator 38 in the tank 15, best shown in Fig. 12. This agitator has three nipples 39, which preferably are one-eighth inch in size. These nipples throw a stream under pressure across the bottom of the tank, serving to maintain the spraying material thoroughly agitated. The results I have obtained by the use of this agitator are extremely beneficial and eliminate much of the complicated apparatus previously required in this art.

It will be well at this point to indicate that wheel 20, shown in Fig. 3, controls the agitator and shuts off the flow of liquid thereto when required. Additional flexible pipes, or tubing, 40, 41 and 42, lead from the manifold 32 to the forward end of the tunnel, and are utilized for carrying spraying material from the manifold into a series of spray nozzles in a manner to be described hereinafter. Suffice it to say at this point, that the lever handle 17 controls the flow of liquid from the manifold through pipe 40, while lever handles 18 and 19 control the flow of fluid through pipes 41 and 42 respectively. In this way, the operator may, by manipulating any one of the lever handles 17, 18 or 19, shut off the flow of liquid through certain of the nozzles, for purposes to be set forth.

For allowing the entry of air into the tunnel, the upper portion thereof is formed of heavy metal screening 43, and preferably, this screening comprises the main part of three doors 45, 46 and 47 hinged along line 48 at each side of the machine. In Fig. 2, the three doors 45, 46 and 47 on one side of the machine are shown in their open position, the three similar doors on the other side being shown shut.

It will be noted that the door 47 carries a baffle 49 and a baffle 50, these being nothing more than plates suitably secured, as is best seen in Fig. 3, in planes parallel to the longitudinal axis of the air tunnel. A further baffle plate 51 is carried by brackets 52 secured to the motor for cooperation with the baffle plates 49 and 50, as shown.

The corresponding door 47 on the other side of the machine carries baffle plates 54 and 55. The baffles so described are extremely necessary and important for the best operation of my machine and serve to prevent the banking of air at one side of the propeller. I have found as an actual fact that unless these baffles are utilized, the air will bank at one side of the propeller, causing unequal distribution of air and unequal pressure. The utilization of these baffles is therefore extremely necessary for the best operation of the machine of my invention. Naturally, there may be changes in the number and in the position of the baffles depending on particular circumstances.

Secured near the exhaust end of my air tunnel 14 and in juxtaposed relation to the propeller 24, are a series of horizontal metal plates 56 and vertical plates 57, all as is best shown in Fig. 4. These plates form a series of square box-like openings through which the air from the propeller passes, and it will be readily appreciated that the plates will serve to straighten the air blast and eliminate any cross currents which may be formed therein. The plates 56 and 57 may be secured as by welding to the tunnel 14. Incidentally, in Figs. 3 and 4, I illustrate how my air tunnel is secured to the chassis 10 through the intermediary of angle irons 58.

Just within the air tunnel 14 is mounted a circular metal member 59, best shown in Figs. 5, 7 and 8, and concentric with the propeller 24. This circular metal member is secured by welding to a circular metal plate 61 extending from the air tunnel surface, and preferably welded to that surface. It may be well to point out that I do not lay stress on the details of the construction of my machine, its construction varying as mechanical equipment and processes change. The area defined by member 59 is smaller than the area of tunnel 14, the plate 61 acting to shut off the tunnel area about the member 59. The area defined by member 59 is also smaller than that covered by the propeller in its rotation within the tunnel.

I have arranged to thus cut down the effective area of the air tunnel because I have discovered that if I use a tunnel opening of the same size as the propeller, the air pressure generated somewhat inwardly of the very edge of the propeller will be greater than at the edge of the propeller, causing a pulling in of the air by the propeller towards the center thereof, and leaving somewhat of a low pressure area about the ends of the propeller. This causes an uneven distribution of the air with its attending ill effects. By cutting down the effective area of the tunnel to that of a circle whose diameter is somewhat less than the length of the propeller, I have eliminated the defects previously present.

Mounted within the area defined by the circular member 59 just described, are a series of horizontal vanes 62, whose inner edges 63 are secured between the inner surfaces of a U clip plate 64 which in turn is secured as by welding at its ends to the circular member 59. It will be noted from Fig. 8 that there are two series of horizontal vanes 62. Those of the upper series 62a have their outer ends riveted to a series of clips 65, which in turn are secured to a vertical rod 66. Various rods are used to reinforce the vanes and clips, all as is necessary to give the required degree of strength.

Pivoted to the vertical rod 66 as at 67 is a bar 68, which in turn is pivoted at 70 to a lever 71, secured to a rod 72, which rod is supported at one end in a bearing 73, best shown in Fig. 5, and at its other end in a bearing 74. Pinned to the rod 72 is a lever 75 which in turn is secured at 76 to a rod 77 running rearwardly to the base of the air tunnel. There it is connected at 78 to a further rod 79. This rod 79 is in turn operable by the ratcheted horizontally moving rod 21 previously described.

It is obvious that movement of the lever 21 to any of its positions will, through the connections previously described, move the series of vanes 62a, best shown in Fig. 6, to any of their deflecting positions. It should be particularly understood at this time that the vanes 62 are formed of readily flexing metal, so that they readily assume the curved contours shown in Fig. 6. Those skilled in the art will understand that the curved contour of vanes 62 is especially well adapted to give direction to the air.

In Fig. 8, the upper series 62a of vanes 62 are shown in one of their positions. The lower series 62b of vanes 62 are suitably operated by a vertical rod 80 which is similar in every respect to the rod 68, and is controlled by a similar linkage through the ratcheted horizontal lever 22. By operating this lever 22, the series 62b of the horizontal vanes 62 at the lower part of the tunnel are operated similarly to the upper series of vanes 62a, all as is quite apparent.

Extending from the tunnel at each side thereof is a bracket 81, best shown in Figs. 1, 2, 5 and 8. Pivoted to this bracket 81 on pivot shaft 82 is what I term a deflector assembly, best shown in Figs. 10 and 11. This deflector assembly has a bracket 83 whereby it is supported at 82 for tilting relatively to the bracket 81. Extending from the upper portion of each side of the assembly is a strip 84 having a series of holes 85. This strip 84 cooperates with brackets 86 extending from each side of the tunnel. By passing bolts 87 (best shown in Fig. 8) through certain selected ones of the holes 85, and holes in brackets 86, the deflector assembly may be secured in its position of Fig. 10 relatively to the tunnel, or in its pivoted position of Fig. 8, or in intermediate positions, all for a purpose to be described hereinafter.

The deflector assembly comprises a pair of main deflectors 88 which are secured to one another at 89 along the middle vertical axis of the air tunnel. Suitable rods 90 and 90a brace the main deflectors in their position of Fig. 11. It is the purpose of the two deflectors 88 to convert the single blast of air issuing from the tunnel into two diverging air streams.

I have found that if I rely solely on the deflectors 88, the air which strikes each of the deflectors at, let us say, along the lines of arrow 91 shown in Figs. 9, 10 and 11, will be opposed or "choked" somewhat by the air stream moving towards the deflector along the lines of arrow 92. I therefore mount a series of auxiliary deflectors 93 in spaced relation to each of the main deflectors 88. It is the purpose of the auxiliary deflectors, whose curvature is substantially the same as the main deflectors 88, to guide the air striking said deflectors, so that the air entering along the lines of arrow 92 and the air entering along the lines of arrow 91 will be directed to form substantially a uniform, unidirectional and smooth flowing air stream. The arrows 91 and 92 of Fig. 9, together with the arrows 91a, 91b and 91c, best illustrate the action of the auxiliary deflectors 93 and the main deflectors 88.

The curvature of the main deflector members 88 is such, moreover, that the air issuing along the lines of arrows 94, as shown in Fig. 11, will be somewhat affected by the low pressure area in the zone between the outside surfaces of the deflectors, designated by reference numeral "L" in Fig. 11. After the air stream has moved a certain distance outwardly, it will be cut off rather sharply and definitely due to its tendency to curve toward the low pressure zone "L," so that the line of demarcation between the area in which spraying material is being deposited by the air stream, and the point where there is no spray and no air stream, will be rather sharp. This is an unusual effect which I obtain by the use of the curved dividing deflectors 88, aided by the auxiliary deflectors 93, all as will be apparent to those who will actually use my apparatus, and who will then be able to observe the effects herein described.

If, in the position of the main deflectors relatively to the horizontal series of vanes 62*a* and 62*b* illustrated in Fig. 2, the vanes 62 of the series 62*a* should be flexed upwardly as shown in Fig. 8, the air stream will move but a very short distance under the influence of the deflectors 88 and 93. Therefore, it is very difficult, if not impossible, with the parts positioned as just outlined, to obtain an upwardly and outwardly directed air stream at each side of the machine, all as is required in this art. It is for this reason that I have mounted the deflector assembly for movement on the brackets 81 into the tilted position of Fig. 8, as previously described by me. With the deflectors away from the horizontal vanes as in Fig. 8, the air stream can move further under the guidance of the horizontal vanes before it is deflected, and therefore, it can have greater heighth of movement imparted thereto.

Referring now to Fig. 8, it will be appreciated that if air is allowed to flow between the vanes 62 in an outward direction, as indicated by the arrows 95, and without further structure being present to direct it, there will be a tendency for considerable of the air to drop or "boil over" behind the deflector assembly in the direction of the arrow 96, as shown in Fig. 8, because of the low pressure area behind the deflector assembly and in the zone "L" of Fig. 11. In order to prevent this, and simultaneously get two upward and outwardly diverging air streams, I mount as part of my deflector assembly, a series of auxiliary vanes 97, as best illustrated in Figs. 8 and 11. There are three of these vanes on each side of the deflector assembly, and these vanes are adapted to receive the air moving outwardly along the lines of arrows 95 from the upper series 62*a* of the horizontal vanes.

The air striking the several auxiliary vanes 97 will be deflected as indicated by the arrows in Fig. 9 into two air streams, and will move towards a further series of auxiliary vanes 98 mounted about the upper edge of the main deflectors 88 and substantially along the upper circumference of the air tunnel, as best illustrated in Figs. 9, 10 and 11. These auxiliary vanes further direct the air upwardly and to each side of the machine into two diverging air streams, and away from the direction indicated by the arrows 96, and in the direction of the arrows 99, thus preventing the "boiling over" of air into the low pressure zone "L." In this way, the horizontal vanes 62, together with vanes 97 and 98, impart real guidance and direction to the air streams they control.

It will be well to review at this time the control of the main air blast sent forth from the air tunnel and the air streams converted therefrom. It will be noted that with the deflector assembly in the position of Fig. 2, the horizontal vanes 62 of series 62a and series 62b will probably be set horizontally, or perhaps the vanes 62a may be given some slight tilt upward. The main air flow will then be along the line of arrows 91 and 92, as best shown in Figs. 9 and 11, on each side of the machine. Spraying of this character will be well adapted for low trees and ground crops.

Where it is desired to reach somewhat higher trees, the entire deflector assembly will be tilted to the position of Fig. 8, or perhaps an intermediate position. The horizontal series of vanes 62a will also be moved by the control lever 21 into the position of Fig. 8. The air will then emerge along the lines of arrows 95 from between the horizontal vanes 62a, and will contact the auxiliary vanes 97. The air will be deflected by these auxiliary vanes 97 into two diverging air streams and into the area of the further auxiliary vanes 98. The auxiliary vanes 98 direct the air upwardly and outwardly as two air streams, each stream moving along the lines of arrows 99 and away from the low pressure area beyond the deflector assembly. The air streams will thus be directed outwardly and upwardly into the high trees. At the same time, the low pressure area of the zone "L" will still function to contribute a sharp line of demarcation between the spraying zone and the non-spraying zone, as has already been set forth.

There were previously described the three pipes 40, 41 and 42 running from the manifold 32. Pipe 40 leads to point 100 where it is connected to a suitable pipe 101 lying just outside the effective air tunnel as defined by the circular member 59, and in the space 102, as best illustrated in Fig. 5. A series of nozzles 103 having openings 104 are screwed into the pipe 101, as is probably best shown in Fig. 7.

In this way, when spraying fluid is allowed to move into the pipe 100 by the proper manipulation of the lever 17, it will emerge through the openings 104 of the series of nozzles 103. It will be noted that the nozzles are directed away from the air stream, and are somewhat outside the air stream issuing through the effective area of the tunnel and within the member 59. Therefore, the air stream will act to pull in the spraying material issuing from the nozzles, and will diffuse this spraying material throughout the entire air stream. It is emphasized that since the air stream will actually pull the spraying material toward it, it must be appreciated that this will assist in diffusing the spraying material over the air stream.

The pipe 41 leads to the point 41a, best shown in Fig. 5, wherein it is connected to a pipe 105 which extends into a further pipe section 106 in which are mounted horizontal pipes 112 which support additional nozzles 103. Pipe 41 also has an extension leading to the pipe 107 which enters a pipe 108 carried by the deflector assembly. Extending from the pipe 108 are a series of horizontal pipes 109 carrying more nozzles 103. The pipe 42 extends from the manifold to point 110 wherein it is connected to a pipe 111 very similar to the pipe 100, and is used for spraying on the side opposite pipe 110.

When high spraying is desired, the series of nozzles in the pipes 109 and 112 receive spraying material through the pipes described, and this number may be increased. For low spraying, nozzles will be located in greater number near the lower portion of the machine. For spraying at each side of the machine, others of the pipes and nozzles are utilized as has been seen, and their number may be increased. Suffice it to say, the arrangement of the spray carrying pipes and spray nozzles and their control may be varied so that any type of spraying may be accomplished, utilizing, of course, the basic principles of my machine, which require a particular relationship between a plurality of nozzles and an air stream.

The arrangement and principles of operation of the nozzles and the air streams, I believe to be fully explained herein, so that they may be adapted for any particular spraying problem. The theory of operation I have set forth, forms my best explanation today as to the reasons for the results I obtain, but I do not wish to be bound by the said theory. I believe, however, that I have set forth the combination of means whereby my contribution to the art may best be adapted. Naturally, I consider that I am entitled to a monopoly which will prevent the utilization of my invention in some form other than that herein shown, by those skilled in the art.

I now claim:

1. In a machine of the class described, an air tunnel of relatively large area, a propeller for creating an air blast through said tunnel, a series of air guides mounted at that end of said tunnel through which the blast of air leaves the air tunnel, and a series of metal plates each lying in a plane parallel to the axis of said tunnel directly to the rear of said propeller, and at least some of which are spaced circumferentially about said tunnel, said plates constituting air baffles for directing the air fed to said propeller to prevent circular movement thereof and the consequent banking of the air at one side of the propeller, whereby said baffles effect the equal distribution of air over the circular area controlled by said propeller.

2. In a machine of the class described, an air tunnel of relatively large area, a propeller for creating an air blast through said tunnel, a series of air guides mounted at that end of said tunnel through which the blast of air leaves the air tunnel, and a series of metal plates each lying in a plane parallel to the axis of said tunnel and at least some of which are spaced circumferentially about said tunnel, a part of said air tunnel body being hinged relatively to the remaining part of the air tunnel to allow access to the interior of the tunnel when said part is moved on its hinges, at least one of said plates being secured to said hinged tunnel part for movement therewith out of the tunnel, said plates constituting air baffles for directing the air fed to said propeller to prevent the banking of the air at one side of the propeller, whereby said baffles effect the equal distribution of air over the circular area controlled by said propeller.

3. In a machine of the class described, an air tunnel of relatively large area, a propeller for creating an air blast through said tunnel, a pair of oppositely curved deflectors at the exhaust end of said tunnel and fixed diametrically at their inner ends across the vertical middle of said tunnel for dividing vertically the blast issuing from said tunnel into two diverging air streams; a series of horizontal vanes for directing the air blast with relation to the horizontal positioned between said propeller and said pair of deflectors, and means for feeding spraying material to a position relatively to said air whereby it is formed thereby into a fine fog of spraying material.

4. In a machine of the class described, an air tunnel of relatively large area, a propeller for creating an air blast through said tunnel, a pair of oppositely curved deflectors at the exhaust end of said tunnel for dividing vertically the blast issuing from said tunnel into two diverging air streams, a series of horizontal vanes for directing the air blast with relation to the horizontal positioned between said propeller and said pair of deflectors, and auxiliary curved vanes secured upwardly in relation to said horizontal vanes and relatively to said pair of deflectors whereby to assist in guiding the air streams in an upwardly curved direction and away from the space defined by the outer surfaces of the pair of deflectors, and means for feeding spraying material to a position relatively to said air whereby it is formed thereby into a fine fog of spraying material.

5. In a machine of the class described, an air tunnel of relatively large area, a propeller for creating an air blast through said tunnel, a pair of oppositely curved deflectors at the exhaust end of said tunnel for dividing vertically the blast issuing from said tunnel into two diverging air streams, a series of horizontal vanes for directing the air blast with relation to the horizontal positioned between said propeller and said pair of deflectors, means whereby said pair of deflectors are movable to a position away from said horizontal vanes so as to allow said horizontal vanes to impart more direction to said air blast, and auxiliary curved vanes secured upwardly in relation to said horizontal vanes and to said pair of deflectors whereby to assist in directing the air streams in an upwardly and outwardly diverging curved direction and away from the space defined by the outer surfaces of the pair of deflectors, and means for feeding spraying material to a position relatively to said air whereby it is formed thereby into a fine fog of spraying material.

6. In a machine of the class described, an air tunnel of relatively large area, a propeller for creating an air blast through said tunnel, a series of horizontal vanes at the exhaust end of said tunnel and movable into position to direct the air blast upwardly, a pair of oppositely curved deflectors supported beyond said vanes for dividing vertically the blast issuing from said tunnel into two diverging air streams, a series of spraying nozzles located at the exhaust end of said tunnel and just outside the outer circumference of said tunnel whereby the blast of air will pull into itself spraying material fed from said nozzles and will form it into a fine fog of material, and means for feeding spraying material to said nozzles.

7. In a machine of the class described, an air tunnel of relatively large area, a propeller for creating an air blast through said tunnel, a series of horizontal vanes at the exhaust end of said tunnel and movable into position to direct the air blast upwardly, a pair of deflectors supported beyond said vanes for dividing vertically the blast issuing from said tunnel into two diverging air streams, a series of auxiliary vanes secured between said horizontal vanes and said pair of deflectors and near the upper of said horizontal vanes, said auxiliary vanes assisting said horizontal vanes in directing the air upwardly and away from the space defined by the outer surfaces of said pair of vertical deflectors, and means for feeding spraying material to said air whereby it is formed thereby into a fine fog of material.

8. In a machine of the class described, an air tunnel of relatively large area, a propeller for creating an air blast through said tunnel, a series of horizontal vanes at the exhaust end of said tunnel and movable into a position to direct the air blast upwardly, a pair of oppositely curved deflectors supported beyond said vanes and meeting at the vertical middle of said tunnel for dividing vertically the blast issuing from said tunnel into two diverging air streams, a series of spaced auxiliary vanes secured between said horizontal vanes and said pair of deflectors and having the same general curvature as said pair of deflectors, said spaced auxiliary vanes lying in an upper sector as defined by said air tunnel for assisting said horizontal vanes in directing upwardly the air first directed upwardly by said horizontal vanes while forming it into two diverging air streams, a series of additional vanes located above said spaced auxiliary vanes and adapted for further directing the air upwardly and for deflecting it into two air streams and away from the space defined by the outer curved surfaces of said pair of vertical deflectors, and means for feeding spraying material to said air whereby it is formed thereby into a fine fog of material.

9. In a machine of the class described, an air tunnel of relatively large area, a propeller for creating an air blast through said tunnel, a series of horizontal vanes at the exhaust end of said tunnel and movable into position to direct the air blast upwardly, a pair of oppositely curved deflectors supported beyond said vanes and meeting at the vertical middle of said tunnel for dividing vertically the blast issuing from said tunnel into two diverging air streams, a series of spaced auxiliary vanes secured between said horizontal vanes and said pair of deflectors, said spaced auxiliary vanes lying in an upper sector as defined by said air tunnel for assisting said horizontal vanes in directing upwardly the air first directed upwardly by said horizontal vanes and in deflecting said air into two diverging air streams, a series of spaced auxiliary deflectors also secured between said horizontal vanes and said pair of deflectors and having the same general curvature as said pair of deflectors, said spaced auxiliary deflectors lying in the right and left as well as the lower sectors of the circle defined by said air tunnel and assisting said pair of deflectors in dividing said air blast vertically, and means for feeding spraying material to said air whereby it is formed thereby into a fine fog of material.

10. In a machine of the class described, an air tunnel of relatively large area, a propeller for creating an air blast through said tunnel, a series of horizontal vanes at the exhaust end of said tunnel and movable into position to direct the air blast upwardly, a pair of oppositely curved deflectors supported beyond said vanes and meeting at the vertical middle of said tunnel for dividing vertically the blast issuing from said tunnel into two diverging air streams, a series of spaced auxiliary vanes secured between said horizontal vanes and said pair of deflectors, said spaced auxiliary vanes lying in an upper sector of the circle as defined by said air tunnel for assisting said horizontal vanes in directing upwardly the air first directed upwardly by said horizontal vanes and in deflecting said air into two diverging air streams, a series of spaced auxiliary deflectors secured between said horizontal vanes and said pair of deflectors and having the same general curvature as said pair of deflectors, said spaced auxiliary deflectors lying in the right and left as well as the lower sectors of the circle defined by said air tunnel and assisting said pair of deflectors in dividing said air blast vertically into two air streams, means for imparting curvature to said horizontal vanes for guiding said air blast upwardly, means for moving said vertical deflectors and said auxiliary vanes and deflectors outwardly relatively to said horizontal vanes to allow for a better functioning of said horizontal and auxiliary vanes, and means for feeding spraying material to said air whereby it is formed thereby into a fine fog of material.

11. In the combination of claim 9, rows of nozzles lying substantially along lines extending from the end of the tunnel to the upper edges of said pair of deflectors whereby the air blast will pick up spraying material from said nozzles and form it into a fine fog of material, and means for feeding spraying material to said nozzles.

12. In the combination of claim 9, rows of nozzles lying substantially along lines extending from the end of the tunnel to the upper edges of said pair of deflectors whereby the air blast will pick up spraying material from said nozzles and form it into a fine fog of material, and additional nozzles extending about the end periphery of said tunnel whereby the air blast will pick up material from said nozzles also, and means for feeding spraying material to said nozzles.

13. In a machine of the class described, an air tunnel of relatively large area, a propeller for creating an air blast through said tunnel, means at the exhaust end of said tunnel for directing the flow of the air blast when it leaves the tunnel, a pipe conducting spraying fluid mounted about the outer periphery of said tunnel and somewhat inwardly of the end thereof, a series of nozzles extending from said pipe and also located just inwardly of the end of the tunnel whereby the air blast issuing from said tunnel will pull the spraying material issuing from said nozzles into said air blast and will form it into a fine fog of material.

14. In a machine of the class described, an air tunnel of relatively large area, a propeller for creating an air blast through said tunnel, deflectors positioned at the exhaust end of said tunnel for dividing vertically the blast issuing from said tunnel into diverging air streams, a series of horizontal vanes for directing the air blast with relation to the horizontal positioned between said propeller and said deflectors, means whereby said deflectors are movable into a position displaced further away from said horizontal vanes so as to allow said horizontal vanes to impart more direction to said air blast prior to vertical diversion by said deflectors, and means for feeding spraying material to a position relatively to said air whereby it is formed thereby into a fine fog of spraying material.

15. In a machine of the class described, an air tunnel, a propeller and a driving motor therefor in said tunnel adapted to create an air blast in said tunnel, air guiding and deflecting means at the end of said tunnel for directing the blast of air issuing from said tunnel, means for feeding spray material to a point relatively to said tunnel where the air of said blast will form said spraying material into a fine fog of material, controls for said guiding and deflecting means extending to a particular location in said air tunnel, controls for said spray feeding means extending also to said particular location in said tunnel, said tunnel having sufficient space at said particular location to house an operator to manipulate said controls.

16. In a machine of the class described, an air tunnel, a propeller and a driving motor therefor in said tunenl adapted to create an air blast in said tunnel, air guiding and deflecting means at the end of said tunnel for directing the blast of air issuing from said tunnel, means for feeding spray material to a point relatively to said tunnel where the air of said blast will form said spraying material into a fine fog of material, controls for said guiding and deflecting means extending to a particular location in said air tunnel, said tunnel having sufficient space at said particular location to house an operator to manipulate said controls.

17. In a machine of the class described, an air tunnel, a propeller for generating an air blast through said tunnel, means for feeding spraying material to a plurality of points relatively to said air blast whereby said air blast picks up said material and forms it into a fine fog of material, a series of air guides at the exhaust end of the tunnel for directing the blast of air issuing from said tunnel, a deflector assembly positioned bodily beyond and in spaced relation to said air guides for dividing the air blast directed by said air guides into diverging air streams, and means for positioning said deflector assembly in any one of several different bodily spaced positions relatively to said air guides to vary the effect of the deflectors of said assembly on said air blast.

18. In a machine of the class described, an air tunnel of relatively large area, a propeller for creating an air blast through said tunnel, a series of air guides mounted at that end of said tunnel through which the blast of air leaves the air tunnel, and air baffles on the intake side of said propeller and directly rearwardly of said propeller for preventing a circular movement of the air moving toward said propeller, whereby the air is prevented from banking relatively to said propeller and will be equally distributed over the circular area controlled by said propeller.

19. In a machine of the class described, an air tunnel of relatively large area, a propeller for creating an air blast through said air tunnel, a series of air guides mounted at that end of the tunnel through which the blast of air leaves the tunnel, and a series of fixed air straightening plates between the propeller and the said guides positioned perpendicularly to the plane of rotation of said propeller and forming a series of lattice-like openings over the cross sectional area of said tunnel and through which the blast of air is forced toward said air guides, substantially for the purpose described.

20. In a machine of the class described, an air tunnel of relatively large area, a propeller for creating an air blast through said tunnel, a deflector assembly comprising a pair of oppositely curved deflectors, adjustable mounting means for said deflector assembly adapted to mount said deflector assembly at the exhaust end of the tunnel with the inner edge of each deflector extending diametrically across the exhaust end of the tunnel and said edges meeting at substantially the vertical middle of the said tunnel for dividing vertically the blast issuing from said tunnel into diverging air streams, said adjustable mounting means being constructed for the mounting of said deflector assembly in any one of a series of positions spaced from the end of said tunnel whereby to vary the effect of said curved deflectors on the air stream issuing from the said tunnel, and means for feeding spraying material into a position relatively to said air whereby it is formed thereby into a fine fog of spraying material.

21. In a machine of the class described, an air tunnel of relatively large area, a propeller for creating an air blast through said tunnel, a pair of oppositely curved sheet-like deflectors at the exhaust end of said tunnel and having inner edges fixed at substantially the vertical middle of said tunnel for dividing vertically the blast issuing from said tunnel into two diverging air streams, a series of spaced auxiliary sheet-like deflectors substantially parallel in curvature to each deflector of said pair of deflectors and positioned across the end of the tunnel and relatively to the inner surfaces of said deflectors for assisting the deflectors in the dividing of said air blast issuing from said tunnel into said two diverging consolidated air streams, the sheet-like auxiliary deflectors and said pair of deflectors being adapted to direct while not impeding or contracting the flow of the air blast, and means for feeding spraying material to a position relatively to said air whereby it is formed thereby into a fine fog of spraying material.

22. In a machine of the class described, an air tunnel of relatively large area, a propeller for creating an air blast through said tunnel, a series of air guides at the exhaust end of the tunnel for directing the blast of air issuing from said tunnel, a pair of oppositely curved deflectors positioned bodily beyond and in spaced relation to said air guides and meeting at the vertical middle of said tunnel and guided by said air guides for dividing vertically the blast issuing from said tunnel into two diverging consolidated air streams, a series of spraying nozzles located at the exhaust end of said tunnel and about the outer circumference of said tunnel for feeding spraying material into said air blast, and means for feeding spraying material to said nozzles.

GEORGE W. DAUGHERTY.

CERTIFICATE OF CORRECTION.

Patent No. 2,331,107. October 5, 1943.

GEORGE W. DAUGHERTY.

It is hereby certified that error appears in the printed specification of the above numbered patent requiring correction as follows: Page 8, second column, lines 14 and 15, claim 22, strike out the words "and guided by said air guides" and insert the same after "tunnel" in line 16, same claim, and that the said Letters Patent should be read with this correction therein that the same may conform to the record of the case in the Patent Office.

Signed and sealed this 8th day of February, A. D. 1944.

(Seal)

Henry Van Arsdale,
Acting Commissioner of Patents.